(12) United States Patent
August et al.

(10) Patent No.: US 9,328,872 B2
(45) Date of Patent: May 3, 2016

(54) MULTIPLE CHEMICAL SUPPLY LINE

(71) Applicant: GE Oil & Gas UK Limited, Bristol (GB)

(72) Inventors: Charles Anthony August, Bristol (GB); Robert Dalziel, Bristol (GB)

(73) Assignee: GE Oil & Gas UK Limited, Bristol (GB)

( * ) Notice: Subject to any disclaimer, the term of this patent is extended or adjusted under 35 U.S.C. 154(b) by 0 days.

(21) Appl. No.: 14/571,775

(22) Filed: Dec. 16, 2014

(65) Prior Publication Data

US 2015/0167899 A1 Jun. 18, 2015

(30) Foreign Application Priority Data

Dec. 18, 2013 (GB) .................................. 1322379.7

(51) Int. Cl.
| | | |
|---|---|---|
| *E21B 37/06* | (2006.01) | |
| *E21B 43/16* | (2006.01) | |
| *F17D 3/03* | (2006.01) | |
| *E21B 41/00* | (2006.01) | |
| *B08B 9/055* | (2006.01) | |
| *F16L 55/46* | (2006.01) | |

(52) U.S. Cl.
CPC . *F17D 3/03* (2013.01); *B08B 9/055* (2013.01); *E21B 37/06* (2013.01); *E21B 41/0007* (2013.01); *F16L 55/46* (2013.01); *Y10T 137/0318* (2015.04); *Y10T 137/87249* (2015.04); *Y10T 137/87571* (2015.04)

(58) Field of Classification Search
CPC ......... E21B 37/06; E21B 43/16; E21B 43/25; C09K 8/58; F16L 55/46
USPC ........................... 166/335, 344, 400; 405/210
See application file for complete search history.

(56) References Cited

U.S. PATENT DOCUMENTS

| | | | | |
|---|---|---|---|---|
| 2,953,146 | A | * | 9/1960 | Gordon .............................. 137/1 |
| 3,648,713 | A | * | 3/1972 | Vairogs ............................. 137/1 |
| 3,731,701 | A | * | 5/1973 | Sugeno ......................... 137/268 |
| 3,750,687 | A | | 8/1973 | Williams |
| 4,132,268 | A | | 1/1979 | Harrison |
| 4,756,370 | A | | 7/1988 | DeBons |
| 5,522,264 | A | * | 6/1996 | Smith et al. ..................... 73/610 |
| 5,779,868 | A | * | 7/1998 | Parce et al. ................... 204/604 |
| 7,234,524 | B2 | * | 6/2007 | Shaw et al. .................... 166/304 |
| 2003/0140944 | A1 | * | 7/2003 | Quarini ............................. 134/8 |
| 2003/0158269 | A1 | | 8/2003 | Smith et al. |
| 2005/0150287 | A1 | * | 7/2005 | Carnegie et al. ........... 73/152.28 |
| 2012/0107051 | A1 | * | 5/2012 | Sweeney et al. ........... 405/184.1 |
| 2014/0301790 | A1 | * | 10/2014 | Chitwood ..................... 405/210 |

FOREIGN PATENT DOCUMENTS

| | | |
|---|---|---|
| EP | 0169723 A2 | 1/1986 |
| GB | 2480427 A | 11/2011 |

OTHER PUBLICATIONS

UK Search Report dated Jul. 9, 2014 which was issued in connection with GB Patent Application No. 1322379.7 which was filed on Dec. 18, 2013.
European Search Report and Written Opinion issued in connection with corresponding EP Application No. 14198017.7 on Aug. 19, 2015.

* cited by examiner

*Primary Examiner* — Matthew R Buck
(74) *Attorney, Agent, or Firm* — GE Global Patent Operation

(57) ABSTRACT

A method of supplying multiple chemicals in a supply line. The method includes: supplying a first chemical to the supply line; and supplying a second chemical, different from the first chemical, to the supply line. The first and second chemicals are sequentially supplied as discrete slugs.

24 Claims, 2 Drawing Sheets

MULTIPLE CHEMICAL SUPPLY LINE

BACKGROUND OF THE INVENTION

Embodiments of the invention relate to an apparatus and method for supplying chemicals in a supply line. In particular, embodiments relate to an apparatus and method for providing multiple chemicals down a single supply line, including from a surface location to an underwater hydrocarbon extraction facility.

The oil and gas industry is increasingly moving towards all-electric arrangements for underwater hydrocarbon extraction facilities (for subsea controls, for example trees and actuators), allowing for an umbilical of reduced cost due to the elimination of, for example, hydraulic lines in the umbilical. A component that cannot be easily removed from the umbilical is a chemical supply line, as these are often needed throughout the life of the facility and chemicals must be supplied at a consistent rate, with one dedicated chemical supply line required for each of various chemicals.

It is an aim of the present invention to reduce the number of chemical supply lines required. This aim is achieved by using a single chemical line to send multiple chemicals, in particular in liquid form, to the underwater area in which they are needed, for example the wellhead of the hydrocarbon extraction facility.

As prior art there may be mentioned GB2480427, which discloses a storage system for chemicals on the seabed.

As further prior art there may be mentioned, EP0169723, which discloses a method of supplying a treatment liquid to different zones in a bottling plant. It shows the use of a single line for multiple chemicals. However, the treatment liquid is mixed with a carrier liquid (see FIG. 4).

BRIEF DESCRIPTION OF THE INVENTION

Embodiments of the present invention are intended for future oil and gas fields where there are no hydraulics, and only electrical power and communications are sent from the surface to subsea. However, chemicals will still be needed subsea for the production fluid. Embodiments of the present invention reduces the need for intervention vessels to fill up large subsea storage tanks if no chemicals supply lines are used on the field.

Embodiments of the invention use a single line to supply an underwater facility with multiple chemicals.

Embodiments of the invention are implemented by sending multiple chemicals down a single supply line, one at a time. Inert 'slugs' or separators may be used between each chemical to separate and maintain separation between them, and these can be, for example, a solid PIG (pipe inspection gauge), a slug of an inert chemical or gel, a plug of ice, or a volume of inert gas (preferably a gas of low reactivity with respect to each chemical, such as, for example, a noble gas, or air), such as a bubble or pocket of inert gas, sent between one required chemical and the next. In this way, the mixing of two chemicals is avoided or significantly reduced.

As an alternative, for example if it is undesirable to use such separators, the chemicals can be sent down the supply line in such an order that adjacent chemicals are immiscible and do not react with one another. In certain embodiments, some mixing may be permitted, and in such cases the mixed fluid sections may be discarded as waste.

If physical slugs or inert substances are used, a return system can be used for these. Such a return system is in place so that any inert chemicals, if used, or mixed sections, if they exist, are passed by the operational components of the underwater facility to a waste storage tank. The waste may then be returned to the surface via a separate line next to the riser, or purged into the production fluid itself.

A balance can be struck between chemical slug volume and storage size to find an optimal solution to reduce waste produced from any mixed chemical sections, PIGs and inert chemicals.

In a further embodiment, the present invention enables a single flow with discrete chemicals arriving in slugs, and manages it to various subsea locations (such as storage, an injection point, or a return/waste system). This can be achieved by the monitoring of the flow by a set of sensors, and then the directing of this flow based on those measurements.

Embodiments of the invention reduces the cost of a field through a reduced number of chemical lines to the field, reduced material requirements and reduced installation costs. It removes the need for excessive storage (compared to the case of smaller, but dedicated chemical lines being included in a field design).

In accordance with a first aspect of the present invention there is provided a method of supplying chemicals via a supply line, the method comprising: supplying a first chemical to the supply line; and supplying a second chemical, different from the first chemical, to the supply line, wherein the first and second chemicals are sequentially supplied as discrete slugs.

In accordance with a second aspect of the present invention there is provided an apparatus for supplying chemicals, comprising: a supply line; a first chemical supply means for supplying a first chemical to the supply line; and a second chemical supply means for supplying a second chemical, different from the first chemical, to the supply line, wherein the first chemical supply means and second chemical means are adapted to sequentially supply the first and second chemicals to the supply line as discrete slugs.

A third chemical could be supplied in the supply line, wherein the third chemical is a different chemical to each of the first and second chemicals, and the first, second and third chemicals are sequentially supplied as discrete slugs.

In the context of the present invention, "discrete" has the meaning that the chemicals are initially supplied in an unmixed form and remain substantially unmixed as they transit through the supply line.

There could be at least one inert separator provided between the first chemical and the second chemical. There could be at least one inert separator between the second chemical and the third chemical.

Each inert separator could comprise one of: a solid pig, an inert fluid, an inert gel, a volume of inert gas, and ice.

The supply line may have first and second ends, chemicals being supplied from the first end to the second end, and chemicals could be stored in respective chemical stores at the second end. The identity of each chemical may be sensed as it arrives at the second end of the supply line, and the arriving chemical may be stored based on its sensed identity. The sensing may comprise sensing one of: electrical capacitance, electrical inductance, resistivity, gamma densitometer, ultrasound, computed tomography (CT), pH measurements, optical measurements, radiological measurements, and fluorescence measurements.

Where inert separators are used, these may each be stored in a waste store at the second end. The identity of each inert separator may be sensed as it arrives at the second end, and the arriving inert separator may be stored based on its sensed identity. The sensing may comprise sensing one of: electrical capacitance, electrical inductance, resistivity, gamma densitometer, ultrasound, computed tomography (CT), pH measurements, optical measurements, radiological measurements, and fluorescence measurements.

The supply line may run between a surface location and an underwater hydrocarbon extraction facility.

BRIEF DESCRIPTION OF THE DRAWINGS

The invention will now be described with reference to the accompanying drawings, which are incorporated herein and constitute a part of the specification, illustrate embodiments of the present invention and, and together with the description, explain these embodiments, wherein.

DETAILED DESCRIPTION

Figure 1:
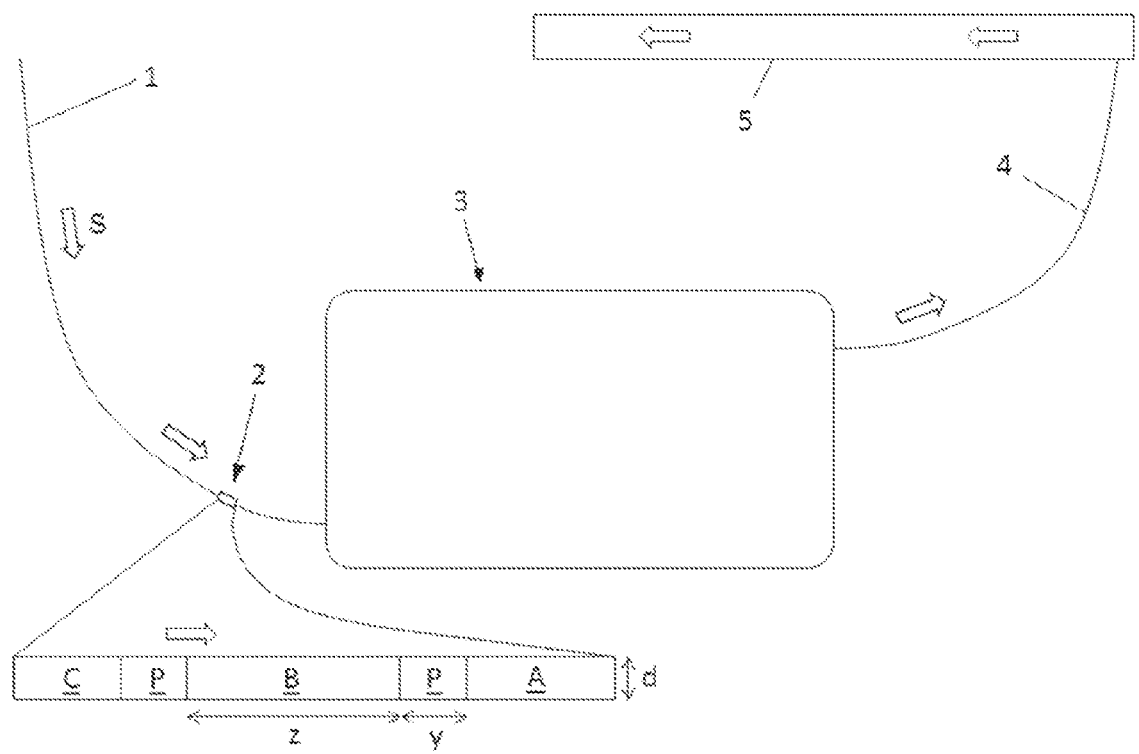
FIG. 1 schematically shows an apparatus in accordance with a first embodiment of the present invention.

FIG. 1 shows a schematic illustration of a method of supplying chemicals in a supply line according to a first embodiment of the invention. A supply line 1 runs from a first end at a surface (topside) location to a second end at an underwater facility 3 (e.g. an underwater hydrocarbon extraction facility).

A detailed cross-section of the supply line is indicated at 2. A first chemical A has been supplied in the supply line 1. A second chemical B, which is a different chemical to the first chemical A, has also been supplied in the supply line 1. A third chemical C, which is a different chemical to both the first chemical A and the second chemical B, has also been supplied in the supply line 1. As indicated by the arrow S, all the chemicals are flowing from the first end of the supply line 1 towards the second end of the supply line 1.

Inert separators P have been provided between each of the chemicals A, B, C. In alternative embodiments, the inert separators may comprise solid PIGs (pipe inspection gauges), or inert fluids/gels, or ice, or a combination thereof. It should be noted that, in a yet further embodiment, the separators P could be omitted if the chemicals A, B, C were chosen and ordered so that the adjacent chemicals in the supply line were immiscible and not reactive with each other. In a yet further embodiment, adjacent chemicals could be permitted to mix to a limited extent, the mixed sections being discarded as waste.

The supply line 1 here is a standard chemical line having a diameter d of 2" (5.08 cm), although d could be any workable diameter in practice. The length of the chemical slugs (for example, length z of second chemical B, as illustrated in FIG. 1) could be on the order of hundreds of meters to hundreds of kilometers, depending on the specific chemical and application. The length y of the inert separators would have a minimum length which would be determined by fluid analysis, and would be dependent on the supply line diameter d, the chemicals used and their respective slug lengths.

Once the chemicals arrive at the second end of the supply line they may be used in operations of the underwater facility 3 as required. Used or redundant chemicals are purged via a purge line 4 into the main production line 5, i.e. that line which transports extracted hydrocarbons from the underwater location to the surface. Alternatively, used or redundant chemicals may be simply purged to the surrounding sea water, although this is not a preferred solution. The inert separators may bypass the operational components of the underwater facility 3 and be purged directly into the purge line 4, or they may be separated into a waste store in the underwater facility 3 for disposal at a later time. Used chemicals/separators may be removed from production fluid at a surface location without significant issue.

If, for example, due to a fault, chemicals have mixed or reacted in the supply line 1, this may be sensed as the chemicals enter the underwater facility 4, and the mixed/reacted chemicals may be separated to bypass the operational components of the underwater facility 3, or they may be separated into a waste store in the underwater facility 3 for disposal at a later time.

Figure 2:
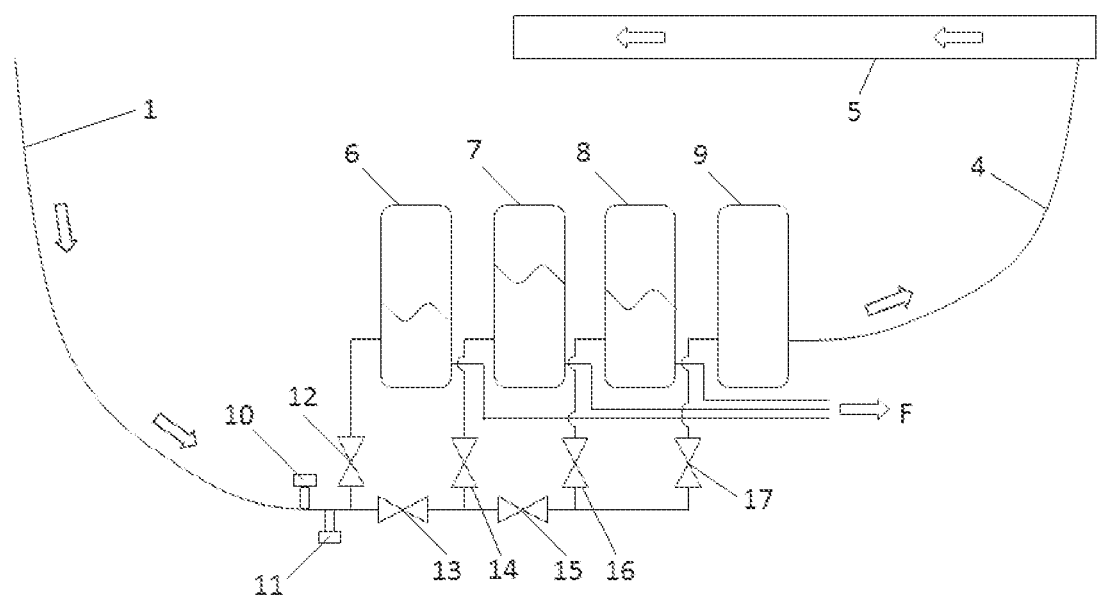
FIG. 2 schematically shows an apparatus in accordance with a second embodiment of the present invention.

A method according to a second embodiment of the invention is illustrated in FIG. 2. Like reference numerals have been retained where possible.

A supply line 1 runs from a first end at a surface (topside) location to a second end at a chemical store on the seabed. The chemical store comprises three chemical storage tanks 6, 7, 8 and a waste storage tank 9. The chemical store may have similar features to other underwater installations known in the art, such as, for example, over-trawl protection, installation and recovery/retrieval points, and work-over access points.

Chemicals are supplied in the supply line similarly to the first embodiment. When a chemical arrives at the second end of the supply line 1, sensors are used to identify (through, for example, sensing of the chemical's density, electrical conductance, etc.) which chemical is currently present at the second end of the supply line. In this case, two sensors 10, 11 are used, each sensing a different parameter, and processing means (not shown) may be used to combine the outputs of each sensor to provide enhanced identification. The control valves 12, 13, 14, 15, 16 are operated to direct the chemical to its respective chemical storage tank in dependence on the output from sensors 10, 11 and associated processing means—e.g. chemical A may be stored in chemical storage tank 6, chemical B may be stored in chemical storage tank 7, and chemical C may be stored in chemical storage tank 8.

With the chemicals separated and stored in their respective chemical storage tanks, they may be used in the operations of an underwater field, as indicated by the arrow F. The fluids may be delivered to one or more point of delivery in the subsea environment, such as, for example, Christmas trees, manifolds, and subsea factory components such as pumps and separators.

If inert separators are used, the sensors 10, 11 may be used to detect when an inert separator arrives at the second end of the supply line 1 and valves 13, 15, 17 operated in response to direct the inert separator to the waste storage tank 9. The sensors 10, 11 may also detect when, for example, due to a fault, chemicals that have mixed or reacted arrive at the second end of the supply line 1, and valves 13, 15, 17 operated in response to direct the mixed/reacted chemicals to the waste storage tank 9.

The contents of waste storage tank 9 may be purged via the purge line 4 into the production line 5 to return them to the surface, or the contents may be kept in waste storage tank 9 for disposal at a later time.

Although three chemicals are shown in the example above, it will be apparent that there is no upper limit on how many different chemicals could be provided using the method and apparatus of the present invention. In practice, the number of different chemicals supplied will depend on the specific application at hand.

Suitable materials for the inner wall of the supply line include PTFE or other non-reactive plastic material, a hydrophobic material, stainless metals such as stainless steel, or ceramics. A hydrophobic-type chemical could also be applied to the inner wall of the supply line to help prevent pipe contamination. If an inert separator is used, the inert separator could be designed to clean the inner wall of the supply line as it moves through the supply line.

Common, bulk fluids used in underwater facilities include ethylene glycol (MEG) and methanol (MeOH). These chemicals would need to be provided in large volumes, therefore their slugs would have lengths of many kilometers.

Fluids required in smaller volumes include scale inhibiters, hydrate inhibitors, etc.

Injection rates may vary between low flow and high flow dependent on chemical demand. Low flow is usually considered as the range of 0.3 liters per hour to 100 liters per hour, with high flow usually being 100 to 9000 liters per hour, with pressures usually from 5 kPsi (34.47 MPa) to 15 kPsi (103.42 MPa).

As discussed above, if inert separators are used these could be solid plugs, or inert fluids/gels, or ice. As a solid plug, pipe inspection gauges (PIGs) could be used. These would need to be collected from the seabed, or could be left on the sea floor if made from a biodegradable material. In all cases the inert separator could be designed to clean or inspect the inner wall of the supply line as it moves through the supply line.

A certain amount of mixing between the inert separators and the chemicals would be acceptable, and the size of each could be changed to allow this. The sensors would then determine when the change has finished tapering from one to the other.

When sensing the inert separators and chemicals for distribution to subsea use or subsea storage, the sensing system should determine: i. When a change occurs from a chemical to an inert separator and vice versa; ii. When the passing fluid is pure enough to be accepted into the rest of the subsea system; and iii. When a PIG arrives at the second end of the supply line, if this is the chosen solution for chemical separation.

The sensing system could use any of the following sensors that are already deployed subsea, such as: i. electrical capacitance/inductance ii. Resistivity iii. gamma densitometer iv. Ultrasound v. computed tomography (CT) vi. pH measurements vii. optical measurements viii. radiological measurements ix. fluorescence measurements.

A combination of dissimilar sensing technologies could deliver a more effective determination of the passing chemical or separator. Any sensors may be provided with associated processing means for using the data produced by the sensor for identification.

The chemical store could store fluids individually via respective fixed volume storage vessels (with or without pressure compensation), or individually via flexible volume storage vessels, such as, for example, inflatable storage devices, or expanding rigid devices. The chemical store could also store fluids multiple fluids in a single storage vessel, either separated by an inert fluid or solid internal divider, or mixed together. If the chemicals are stored in a mixed form, they could be separated at the point of use.

When the chemicals are required for use at some point in the underwater facility, the chemicals may be delivered using in-built pressure from the storage vessel pressure compensation, or they may be delivered using pressure from another part of the system, such as from a work-over system, a local hydraulic system or a local pressure storage system. The chemicals may also be simply pumped to their required destination.

The return system should ensure that any mixed sections that are 'rejected' by the sensing system, and any detected inert sections, are separated to bypass the operational components of the underwater facility. If PIGs are used, a collection method, a pigging loop, or pig launcher to collect the pigs should be provided.

Waste fluids could be discharged into the production line (assuming volumes are not significant). Waste could be temporarily held in a waste storage tank (as standard or in the event of sensor failure) and purged into the production line as, and when, required. Any fluids used to clean or flush the supply line should be directed to the production line or held in the waste storage tank for subsequent disposal.

Refining of the overall efficiency and the reduction of waste would lead to the most cost effective solution. This would include optimising the inert separator/chemical slug size ratio, optimising the flow rate/turbulence/mixing of chemicals and inert sections to an allowable level, and optimising the timing of switching between chemicals (large slugs less often, or many smaller slugs, dependent on the requirements of the underwater facility).

The invention is not limited to the specific embodiments disclosed above, and other possibilities will be apparent to those skilled in the art.

For example, two or more supply lines could be used to give the system redundancy. Although this would increase the cost of the system, it would likely still be cheaper than prior art systems with one line per chemical (often resulting in five or more lines).

An arrangement is possible where the sensors are omitted entirely and replaced with a control system using simple flow meters. As it will be known what order and volume chemicals have been injected into the first end of the supply line at the surface location, a control system at the second end may receive data from the first end to operate the valves and direct chemicals to their respective chemical storage tanks based simply on how much fluid has passed the flow meters. This could also be done based on the time elapsed from chemical injection at the first end.

The subsea chemical store can be entirely omitted in some embodiments, and the chemicals delivered directly to their point of use from the surface on an as-needed basis. Alternatively, the chemical store could be by-passed in an emergency situation or a period of urgent demand, and the required chemical supplied directly to its point of use.

It will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of supplying chemicals via a supply line, wherein the supply line runs between a surface location and a subsea location, the method comprising: supplying a first chemical to the supply line; supplying a second chemical, different from the first chemical, to the supply line, wherein the first and second chemicals are sequentially supplied as discrete slugs, and wherein the step of supplying a second chemical further comprises providing at least one inert separator between the first chemical and the second chemical; cleaning an inner wall of the supply line by the inert separator while the first and second chemicals are being supplied; identifying the first chemical and the second chemical at the supply line; and removing the first and second chemicals from the supply line based on the identification.

2. The method of supplying chemicals according to claim 1, further comprising:
supplying a third chemical to the supply line,
wherein the third chemical is a different chemical with respect to each of the first and second chemicals, and the first, second and third chemicals are sequentially supplied as discrete slugs.

3. The method of supplying chemicals according to claim 2, further comprising providing at least one inert separator between the second chemical and the third chemical.

4. The method of supplying chemicals according to claim 1, wherein the at least one inert separator comprises one of a solid pig, an inert fluid, an inert gel, a volume of inert gas, and ice.

5. The method of supplying chemicals according to claim 3, wherein the at least one inert separator comprises one of a solid pig, an inert fluid, an inert gel, a bubble of inert gas, and ice.

6. The method of supplying chemicals according to claim 1, wherein the supply line has first and second ends, and chemicals are supplied from the first end to the second end; and wherein the method further comprises storing each chemical in a respective chemical store at the second end.

7. The method of supplying chemicals according to claim 6,
wherein the first chemical and the second chemical are identified as each chemical arrives at the second end,
and wherein storing each chemical in a respective chemical store at the second end comprises storing each chemical in a respective chemical store at the second end based on an identity of the arriving chemical.

8. The method of supplying chemicals according to claim 7, wherein identifying each chemical comprises sensing one of electrical capacitance, electrical inductance, resistivity, gamma densitometer, ultrasound, computed tomography (CT), pH measurements, optical measurements, radiological measurements, and fluorescence measurements.

9. The method of supplying chemicals according to claim 6, further comprising storing each inert separator in a waste store at the second end.

10. The method of supplying chemicals according to claim 9, further comprising:
sensing each inert separator as it arrives at the second end to sense an identity of the arriving inert separator,
wherein storing each inert separator in the waste store at the second end comprises storing each inert separator in the waste store at the second end based on the sensed identity of the arriving inert separator.

11. The method of supplying chemicals according to claim 10, wherein sensing each inert separator comprises sensing one of electrical capacitance, electrical inductance, resistivity, gamma densitometer, ultrasound, computed tomography (CT), pH measurements, optical measurements, radiological measurements, and fluorescence measurements.

12. The method of supplying chemicals according to claim 1, wherein the supply line runs between the surface location and an underwater hydrocarbon extraction facility.

13. An apparatus for supplying chemicals, comprising: a supply line, wherein the supply line runs between a surface location and a subsea location; a first chemical supply unit for supplying a first chemical to the supply line; and a second chemical supply unit for supplying a second chemical, different from the first chemical, to the supply line, wherein the second chemical is separated from the first chemical by at least one inert separator configured to clean an inner wall of the supply line while the first and second chemicals are being supplied, and wherein the first chemical supply unit and the second chemical supply unit are configured to sequentially supply the first and second chemicals to the supply line as discrete slugs, the first and second chemicals are being identified at the supply line for removing the first and second chemicals from the supply line.

14. The apparatus for supplying chemicals according to claim 13, further comprising:
a third chemical supply unit for supplying a third chemical to the supply line,
wherein the third chemical is a different chemical with respect to the first and second chemicals, and the third chemical supply unit is adapted to supply the third chemical as a discrete slug.

15. The apparatus for supplying chemicals according to claim 14, further comprising at least one inert separator between the second chemical and the third chemical in the supply line.

16. The apparatus for supplying chemicals according to claim 13, wherein the at least one inert separator comprises one of a solid pig, an inert fluid, an inert gel, a bubble of inert gas, and ice.

17. The apparatus for supplying chemicals according to claim 15, wherein the at least one inert separator comprises one of a solid pig, an inert fluid, an inert gel, a bubble of inert gas, and ice.

18. The apparatus for supplying chemicals according to claim 13, wherein the supply line has first and second ends, and chemicals are supplied from the first end to the second end, and wherein the apparatus further comprises a storage device comprising a respective chemical store for storing each chemical at the second end.

19. The apparatus for supplying chemicals according to claim 18, wherein a sensor is used for identifying the first chemical and the second chemical as each chemical arrives at the second end, and wherein the storage device stores each chemical in a respective chemical store at the second end based on a sensed identity of the arriving chemical.

20. The apparatus for supplying chemicals according to claim 19, wherein the sensor comprises one of an electrical capacitance/inductance sensor, a resistivity sensor, a gamma densitometer sensor, an ultrasound sensor, a computed tomography (CT) sensor, a pH measurement sensor, an optical measurement sensor, a radiological measurement sensor, and a fluorescence measurement sensor.

21. The apparatus for supplying chemicals according to claim 18, further comprising: a waste storing device for storing each inert separator in a waste store at the second end.

22. The apparatus for supplying chemicals according to claim 21, further comprising:
a sensor for sensing each inert separator as it arrives at the second end to sense an identity of the arriving inert separator,
wherein the waste storing device stores each inert separator in the waste store at the second end based on the sensed identity of the arriving inert separator.

23. The apparatus for supplying chemicals according to claim 22, wherein the sensor comprises one of an electrical capacitance sensor, an electrical inductance sensor, a resistivity sensor, a gamma densitometer sensor, an ultrasound sensor, a computed tomography (CT) sensor, a pH measurement sensor, an optical measurement sensor, a radiological measurement sensor, and a fluorescence measurement sensor.

24. The apparatus for supplying chemicals according to claim 13, wherein the supply line runs between the surface location and an underwater hydrocarbon extraction facility.

* * * * *